(12) United States Patent
Vennesland et al.

(10) Patent No.: US 11,895,957 B2
(45) Date of Patent: Feb. 13, 2024

(54) BIODEGRADABLE PLANTER POTS COMPRISING STARCH AND AN OUTER SILICON LAYER

(71) Applicants: Torkild Benn Vennesland, Carolina Beach, NC (US); Ernest D. Whelan, Jackson, NJ (US); John R. Easom, Garfield, NJ (US)

(72) Inventors: Torkild Benn Vennesland, Carolina Beach, NC (US); Ernest D. Whelan, Jackson, NJ (US); John R. Easom, Garfield, NJ (US)

( * ) Notice: Subject to any disclaimer, the term of this patent is extended or adjusted under 35 U.S.C. 154(b) by 121 days.

(21) Appl. No.: 17/700,922

(22) Filed: Mar. 22, 2022

(65) Prior Publication Data
US 2023/0301243 A1    Sep. 28, 2023

(51) Int. Cl.
   *A01G 9/029*    (2018.01)
(52) U.S. Cl.
   CPC .............................. *A01G 9/0291* (2018.02)
(58) Field of Classification Search
   CPC ......... A01G 9/0291; A01G 9/029; A01G 9/02
   See application file for complete search history.

(56) References Cited

U.S. PATENT DOCUMENTS

| | | | | |
|---|---|---|---|---|
| 3,921,333 A | * | 11/1975 | Clendinning | A01G 9/1438 525/169 |
| 2008/0155898 A1 | * | 7/2008 | Wetering | A01G 9/0291 47/74 |
| 2014/0250783 A1 | * | 9/2014 | Keller | B65D 85/52 264/258 |
| 2014/0357752 A1 | * | 12/2014 | Samet | C09D 5/00 47/65.5 |
| 2016/0174469 A1 | * | 6/2016 | Shaffer | A01G 9/0291 47/65.5 |
| 2018/0000017 A1 | * | 1/2018 | Andersen | A01G 9/021 |
| 2018/0077878 A1 | * | 3/2018 | Sands | A01G 13/10 |
| 2020/0260657 A1 | * | 8/2020 | Latessa | A01G 9/029 |

\* cited by examiner

*Primary Examiner* — Kristen C Hayes
(74) *Attorney, Agent, or Firm* — Ashley D. Johnson; Dogwood Patent and Trademark Law (57) ABSTRACT

Biodegradable planter pots constructed from starch and an outer silicon layer. The starch provides a biodegradable and/or compostable characteristic to the pot, allowing it to be broken down into the soil after the pot has been planted. The outer silicon layer provides durability to the pots, allowing them to retain their shape for an additional period of time and withstand handling, while also retaining the biodegradable characteristics of the pots. Advantageously, the pots allow seedlings and seeds to be directly deposited into the soil, while also providing structure to the plant for the initial growth period. Advantageously, the pots provide a stable structural support that is hardy and/or water-resistant but can also being broken down as the plant grows.

20 Claims, 7 Drawing Sheets

BIODEGRADABLE PLANTER POTS COMPRISING STARCH AND AN OUTER SILICON LAYER

TECHNICAL FIELD

The presently disclosed subject matter is generally directed to a planter pot that is fully or partially biodegradable, comprising starch and a food grade outer silicon layer. The presently disclosed subject matter also includes methods of making and using the disclosed pots.

BACKGROUND

Home gardening is a popular pastime for many people. Plant pots are commonly used by nurseries, greenhouses, or homes to grow plants. Typically, small or seedling plants are started from seed within the pots so that the plants can be nurtured, transported, displayed, and sold to consumers. A gardener will typically remove the plant, its root ball, and a quantity of potting soil for transplanting within a prepared soil hole or depression. However, the removal or separation process can cause damage to the plant and the plant root system (root trauma). Further, the conventional plastic pots are discarded after the plant has been transplanted, adding to the large volume of non-biodegradable trash accumulated in landfills. In large scale growing operations (such as at commercial growing fields), seasonal planting of new plants can create a huge volume of discarded plastic pots. To combat this issue, degradable pots comprising materials such as compressed peat moss have been used. However, these materials are fragile, and the pots are unable to include many of the features that can be integrated with plastic pots (e.g., shaped pots, drainage). It would therefore be beneficial to provide planter pots constructed from one or more biodegradable materials that exhibit improved properties, such as ease of handling and use.

SUMMARY

In some embodiments, the presently disclosed subject matter is directed to a planter pot. Specifically, the planter pot comprises a bottom face joined to a lower face of one of more sidewalls, thereby creating a pot with an open top and an interior compartment. The planter pot bottom face and one or more sidewalls comprise starch. The planter pot is defined by an outer surface comprising a water-resistant food grade silicon layer coating. In addition, the planter pot is biodegradable (e.g., about 100 percent biodegradable).

In some embodiments, the planter pot bottom face and one or more sidewalls comprise 100 weight percent starch.

In some embodiments, the planter pot bottom face and sidewalls comprise about 70-99 weight percent starch and about 1-30 weight percent additives.

In some embodiments, the starch is cassava starch.

In some embodiments, the additives are selected from one or more of clay, cellulose, calcium carbonate, calcium sulfate, copper, zinc, magnesium iron, sulfur, boron, sodium, manganese, cobalt, nitrogen, phosphorous, and potassium.

In some embodiments, the planter pot further includes at least one aperture positioned on a surface of the planter pot.

In some embodiments, the food grade silicon layer is deposited on the outer surface by spraying.

In some embodiments, the food grade silicon layer comprises elemental silicon, silica, silicate, or combinations thereof.

In some embodiments, the silicon layer has a thickness of about 0.0001-0.1 inches.

In some embodiments, the planter pot resists the penetration of water by at least about 30, 40, 50, 60, 70, or 80 percent compared to a planter pot that lacks the water-resistant silicon layer.

In some embodiments, the planter pot is fully compostable and biodegradable (e.g., about 100 percent).

In some embodiments, the presently disclosed subject matter is directed to a method of growing a plant. Specifically, the method comprises positioning a plant and soil in a planter pot. The planter pot is defined by a bottom face joined to a lower face of one of more sidewalls, thereby creating a pot with an open top and an interior compartment. The planter pot bottom face and one or more sidewalls comprise starch. The planter pot is defined by an outer surface comprising a water-resistant food grade silicon layer. The planter pot is biodegradable. The method includes planting the planter pot in the ground or in the soil, whereby the planter pot biodegrades, and the plant grows and feeds off of the starch.

In some embodiments, the planter pot is directly planted in soil in the ground or soil in a larger pot.

In some embodiments, the planter pot has fully degraded about 20-200 days after planting.

In some embodiments, the presently disclosed subject matter is directed to a kit. Specifically, the kit comprises a plurality of planter pots, each defined by a bottom face joined to a lower face of one of more sidewalls, thereby creating a pot with an open top and an interior compartment. The planter pot bottom face and one or more sidewalls comprise starch. The planter pot is defined by an outer surface comprising a water-resistant food grade silicon layer and the planter pot is biodegradable. The kit further includes a plurality of plants selected from seeds, seedlings, plants, trees, tubers, or combinations thereof. The kit also includes one or more different soil types.

In some embodiments, the starch is wheat, barley, corn, rye, rice, sorghum, brans, cassava, millet, milo, potato, sweet potato, or tapioca starch.

DETAILED DESCRIPTION

The presently disclosed subject matter is introduced with sufficient details to provide an understanding of one or more particular embodiments of broader inventive subject matters. The descriptions expound upon and exemplify features of those embodiments without limiting the inventive subject matters to the explicitly described embodiments and features. Considerations in view of these descriptions will likely give rise to additional and similar embodiments and features without departing from the scope of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the disclosed packages and methods.

As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the drawing figures. It will be understood that these terms and those discussed above are intended to encompass different orientations of the device in addition to the orientation depicted in the drawing figures.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The presently disclosed subject matter is directed to biodegradable planter pots constructed from starch and an outer silicon layer. The starch provides a biodegradable characteristic to the pot, allowing it to be broken down into the soil after the pot has been planted. The outer silicon layer provides durability to the pots, allowing them to retain their shape for an additional period of time and withstand handling, while also retaining the biodegradable characteristics of the pots. Advantageously, the pots allow seedlings and seeds to be directly deposited into the soil, while also providing structure to the plant for the initial growth period. The pots are also fully biodegradable and can be broken down into the soil. Advantageously, the pots provide a stable structural support that is hardy and/or water-resistant but can also being broken down as the plant grows.

Figure 1A:
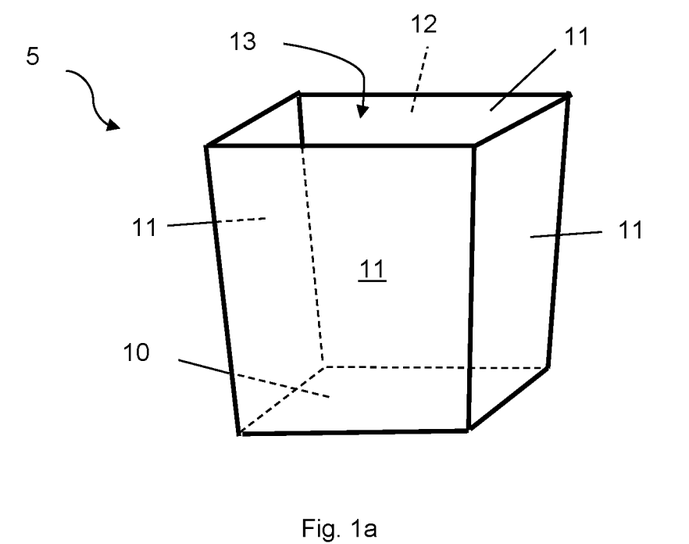
FIG. 1a is a perspective view of a planter pot in accordance with some embodiments of the presently disclosed subject matter.
Figure 1B:
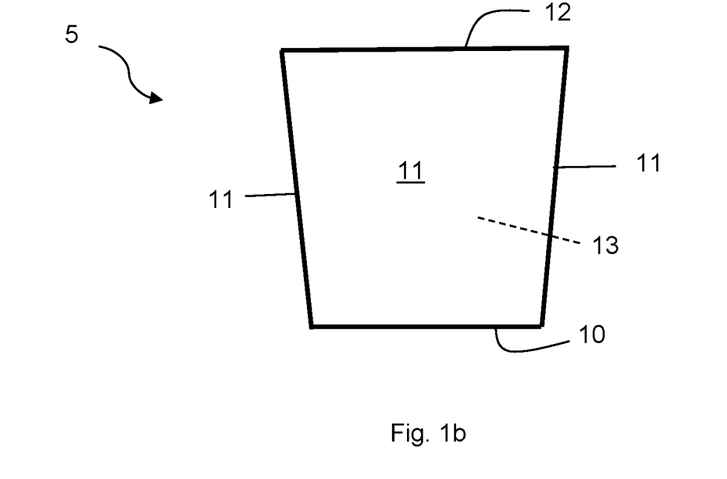
FIG. 1b is a front plan view of a planter pot in accordance with some embodiments of the presently disclosed subject matter.
Figure 2:
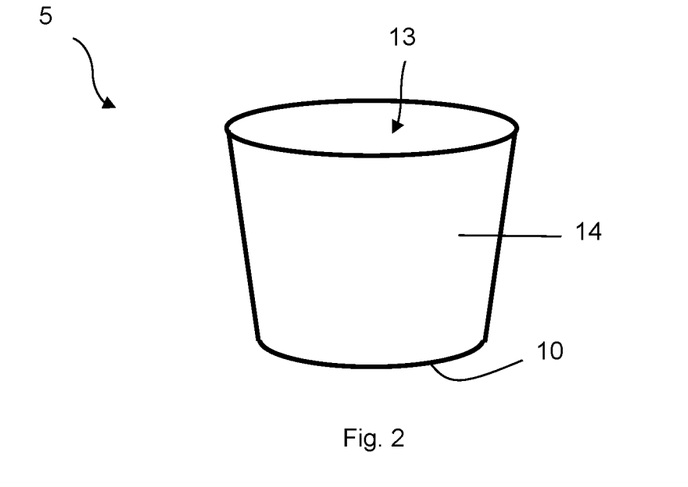
FIG. 2 is a perspective view of a planter pot in accordance with some embodiments of the presently disclosed subject matter.
Figure 3:
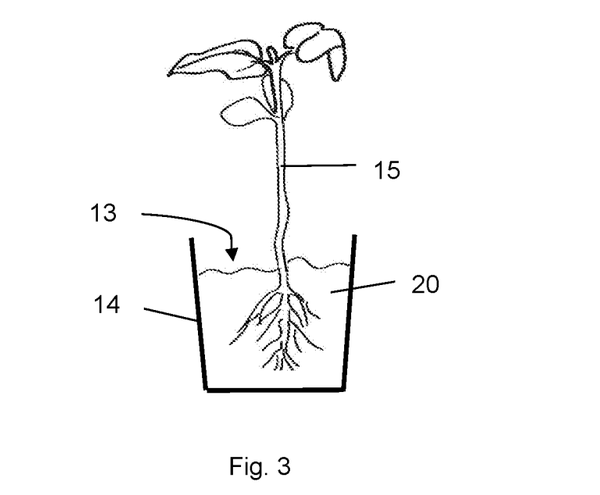
FIG. 3 is a front plan view of a planter pot comprising a plant seedling and soil in accordance with some embodiments of the presently disclosed subject matter.

FIGS. 1*a* and 1*b* illustrate one embodiment of planter pot 5 including bottom face 10 operably connected to a bottom edge of side faces 11 to create open top 12 and interior compartment 13. In lieu of side faces 11, the pot can be configured with sidewall 14 that joins with the bottom face, as shown in FIG. 2. The open top provides access to the container interior for soil, seeds, and plants. The pot interior compartment is configured to house plant 15 and roots 16, as shown in FIG. 3. The term "plant" refers to any species of woody, ornamental, decorative, crop, cereal, fruit plant, vegetable plant, flower, herbs, or tree, and can include whole plants, seeds, roots, tubers, stems, stalks, and/or seedlings. In addition to the plant, interior 14 of the pot is configured to house a volume of soil 20. The term "soil" can include all plant growth media, such as earth, dirt, clay, loam, sand, vermiculite, pearlite, peat moss, compost, and combinations thereof. The pot interior compartment therefore forms a plant growth area that can be planted directly in the soil, as described below.

Pot 5 can have any desired cross-sectional shape, such as (but not limited to) circular, oval, square, rectangular, triangular, and the like. In some embodiments, the shape of pot 5 is tapered from top 12 toward bottom face 10. The tapered shape may be suitable for containment of a plant's root system and from an injection molding standpoint in that mold separation and product separation are facilitated.

Figure 4A:
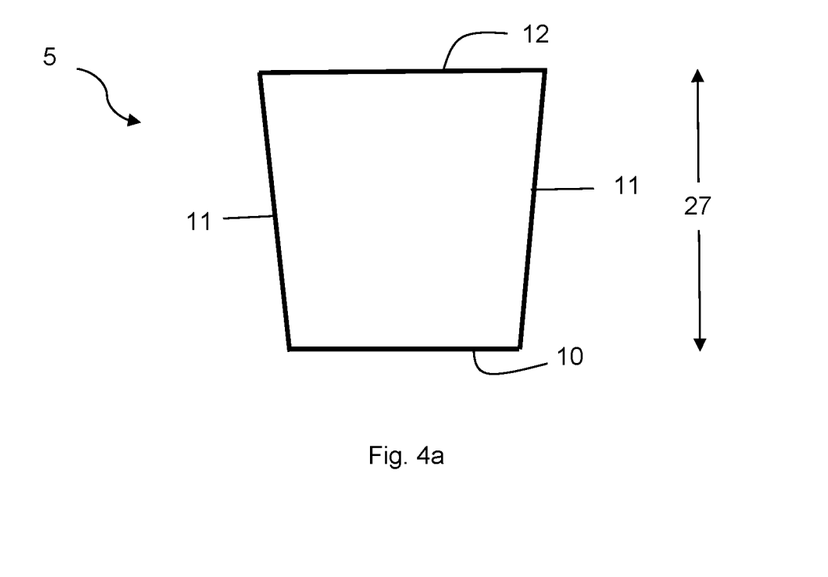
FIG. 4a is a side plan view of a planter pot in accordance with some embodiments of the presently disclosed subject matter.
Figure 4B:
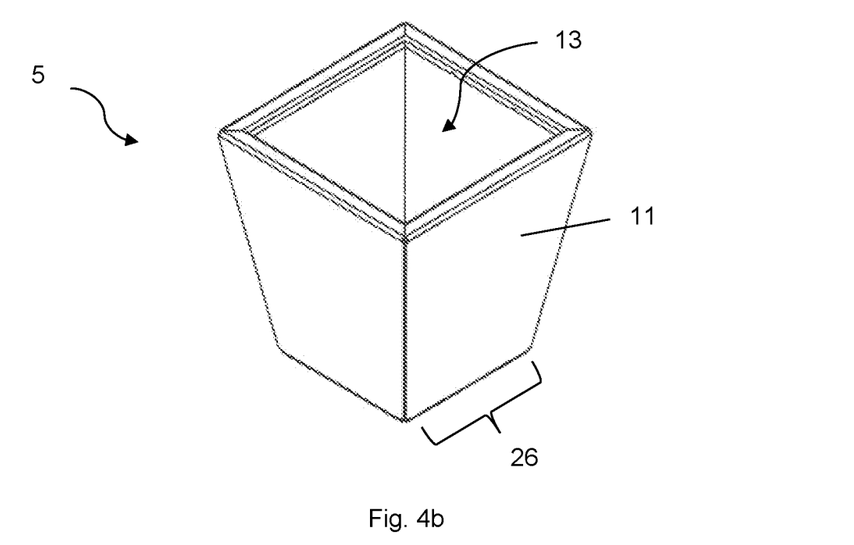
FIG. 4b is a perspective view of a planter pot in accordance with some embodiments of the presently disclosed subject matter.

The disclosed planter pot can be configured in any suitable size to accommodate plants in any growth stage, from seeds to trees. For example, each pot can have length 25, width 26, and/or height 27 of about 1-30 inches (e.g., at least/no more than about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 inches), as shown in FIGS. 4a and 4b. The term "length" refers to the longest horizontal distance from a first side edge to a second side edge of the pot. The term "height" refers to the longest vertical distance of the pot, from the uppermost edge to the lowermost edge. The term "thickness" can refer to the longest straight-line distance from a front edge to a rear edge of the pot. It should be appreciated that the dimensions of pot 5 are not limited to the ranges given above, and can be configured with a length, width, and/or height outside the given range.

Pot 5 can include about 100 weight percent starch (e.g., at least/no more than about 70, 75, 80, 85, 90, 95, or 100 weight percent). The term "starch" refers to any material comprising the complex polysaccharide carbohydrates of plants, including amylose or amylopectin with the formula $(C_6H_{10}O_5)_x$, where "x" can be any number. The term "starch" includes plant-based materials, such as grains, cereal, grasses, tubers and roots, and materials obtained from wheat, barley, corn, rye, rice, sorghum, brans, cassava, millet, milo, potato, sweet potato, and/or tapioca. The term "starch" further includes granular starch (i.e., uncooked starch that has not been subject to gelatinization).

To form each pot 5, starch is mixed with water to form a thick paste. For example, the mixture can include about 30-70 weight percent starch and about 70-30 weight percent water. Thus, the mixture can include about 30, 35, 40, 45, 50, 55, 60, 65, or 70 weight percent starch and about 70, 65, 60, 55, 50, 45, 40, 35, or 30 weight percent water. The paste mixture is positioned into a mold cavity, and a cooperating male insert presses the paste into a desired shape. The mold is heated briefly (e.g., about 1-60 seconds to a temperature of about 100° C.) and the insert is retracted. The heat will evaporate the water to form the pot. The pots can be molded individually or as a tray comprising multiple pots (e.g., 100, 200, 300, or more).

Pot 5 can therefore include about 100 weight percent starch. In other embodiments, the pot can comprise about 70-100 weight percent starch (e.g., at least/no more than about 70, 75, 80, 85, 90, 95, 99, or 100 weight percent), with the remainder comprising one or more additives. The term "additive" can include (but is not limited to) filler (e.g., clay), cellulose, calcium carbonate, calcium sulfate, micronutrients (e.g., copper, zinc, magnesium iron, sulfur, boron, sodium, manganese, cobalt, nitrogen, phosphorous, potassium), and the like as would be known in the art. In some embodiments, the additives are partially biodegradable (about 80-99 percent biodegradable) or fully biodegradable (about 99.9 or 100 percent biodegradable). The additives can be present in the pot in an amount of about 0-30 weight percent (e.g., 0, 1, 5, 10, 15, 20, 25, or 30 weight percent). However, it should be appreciated that the additives are optional, and the disclosed pot can be configured without additives (e.g., 100 weight percent starch).

In some embodiments, the starch and additives can be evenly distributed such that the pot has a visually homogeneous appearance. In other embodiments, the starch and/or additives can be distributed in separate regions that are visually identifiable in the pot. For example, the bottom face or lower half of the pot can include a higher concentration of additives (e.g., micronutrients) compared to the remainder of the container.

Figure 5A:
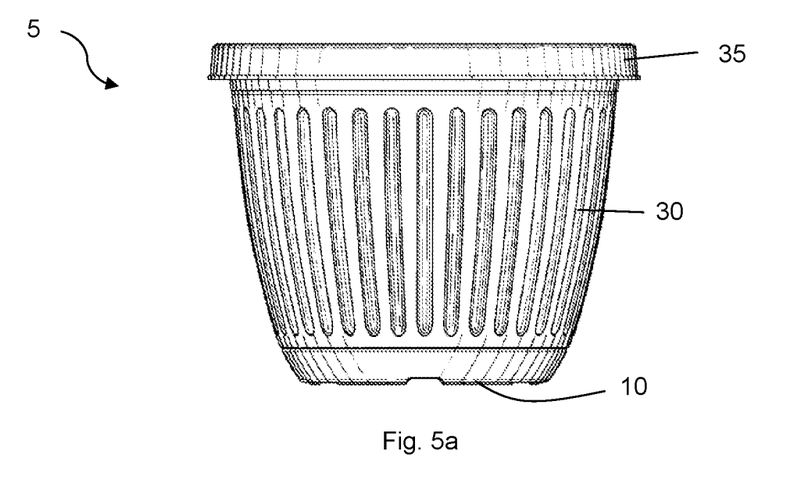
FIG. 5a is a front plan view of a planter pot comprising a lip, apertures, and external features in accordance with some embodiments of the presently disclosed subject matter.
Figure 5B:
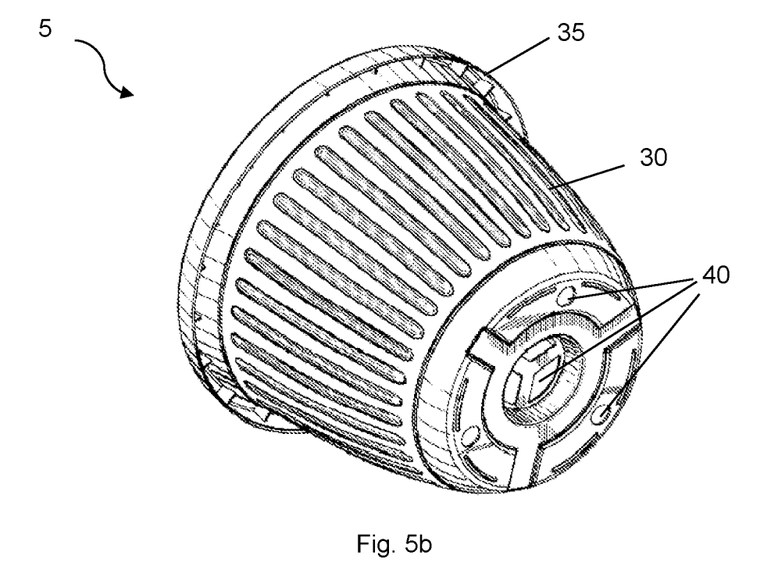
FIG. 5b is a perspective view of the planter pot of FIG. 5a in accordance with some embodiments of the presently disclosed subject matter.

Each pot can be customized to include one or more additional optional features. For example, texturing 30 can be added to one or more surfaces of the pot, as illustrated in FIG. 5a. Any type of texturing can be included, such as the addition of bumps, ridges, indentations, writing, designs, and the like. In addition, lip 35 can be added adjacent to the top edge of the pot. In some embodiments, one or more apertures 40 can further be included on a side and/or bottom face, as shown in FIG. 5b. The apertures can be beneficial to allow for water passage from the pot and permitting root system growth after planting. The apertures also can accommodate biodegradation, creating open spaces within the structure of the pot.

Each pot 5 further includes an exterior silicon layer. The term "silicon" can refer to elemental silicon having the symbol Si and atomic number 4. The term can also include silica and silicates. The term "silica" can include silicon dioxide ($SiO_2$). The term "silicate" refers to any member of the family of anions comprising silicon and oxygen, including orthosilicate, metasilicate, pyrosilicate. In some embodiments, the term "silicon" specifically excludes silicon resin materials. The silicon layer can include about 100 weight percent silicone. In other embodiments, the silicone layer can include about 75-100 weight percent silicon and about 0-25 weight percent additives.

In some embodiments, the exterior layer and/or interior layer of the pot includes food grade silicon. The term "food grade" refers to materials that are safe for food use and/or have been approved for contacting (directly or indirectly) food. Thus, the silicon layer can exclude materials that impart chemicals or agents that are harmful to human, animal, and/or plant health. In some embodiments, a food grade material as disclosed herein meet the requirements of the United States Pharmacopeia (USP grade), the National Formulary (NF grade), and/or the Food Chemicals Codex (FCC grade).

Figure 6A:
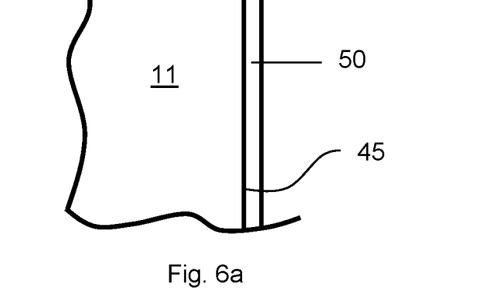
FIG. 6*a* is a fragmentary view of a planter pot wall comprising an outer silicon layer in accordance with some embodiments of the presently disclosed subject matter.
Figure 6B:
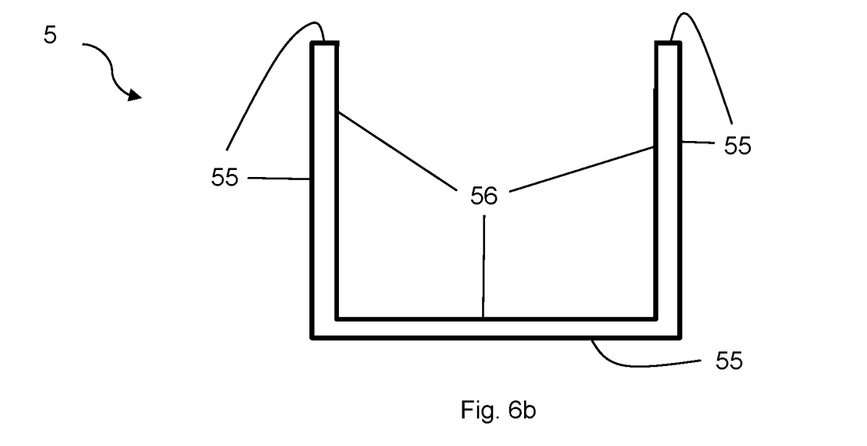
FIG. 6*b* is a cross-sectional front plan view of a planter pot in accordance with some embodiments of the presently disclosed subject matter.

The silicon layer can be present on the exterior and/or interior surface of pot 5, such as through a spraying or other action. The outer layer can have thickness of about 0.0001-0.1 inches (e.g., at least/no more than about 0.0001, 0.0005, 0.001, 0.005, 0.01, 0.015, 0.02, 0.025, 0.03, 0.035, 0.04, 0.045, 0.05, 0.055, 0.06, 0.065, 0.07, 0.075, 0.08, 0.085, 0.09, 0.095, or 0.1 inches). FIG. 6a illustrates exterior surface 45 of pot 5 comprising silicon coating layer 50. The exterior surface of the pot can include outer surface 55, as well as the interior surface 56 of the pot (adjacent to where the plant and soil are positioned), as shown in FIG. 6b. The exterior surface is therefore any pot surface that is exposed to the external environment. Thus, the outer surface and/or interior surface of the pot can include the silicon layer coating. In some embodiments, the entire pot has an outer silicon layer coating. Advantageously, the silicon layer prevents premature degradation of the pots when exposed to water, soil, humidity, and the like. Thus, the silicon layer prevents degradation of the pots while still on the shelf of the nursery but allows the pot to degrade once planted. In some embodiments, the pots exhibit an increased lifespan of about 10-50 percent greater than pots without the silicon layer. For example, the disclosed pots can have a lifespan of 10, 14, 21, 30, 45, 60 or 90 days (compared to a lifespan of 5-45 days for pots that exclude the silicon layer).

In some embodiments, silicon layer 50 provides a water-resistant characteristic to pot 5. The term "water resistant" refers to materials that generally repel or resist penetration by water through the material where the materials are not entirely waterproof. In other words, water-resistant materials generally hinder the penetration of water by at least or no more than about 30, 40, 50, 60, 70, or 80 percent compared to pots that lack the silicon layer.

In some embodiments, the silicon layer is positioned on pot 5 by a spraying action to coat the entire exterior surface of the pot, the interior surface, and/or the outer surface. Alternatively or in addition, the pot can be dipped, casted, poured, or spread onto the outer pot surface and the excess evaporated, dried, or otherwise removed.

Figure 7A:
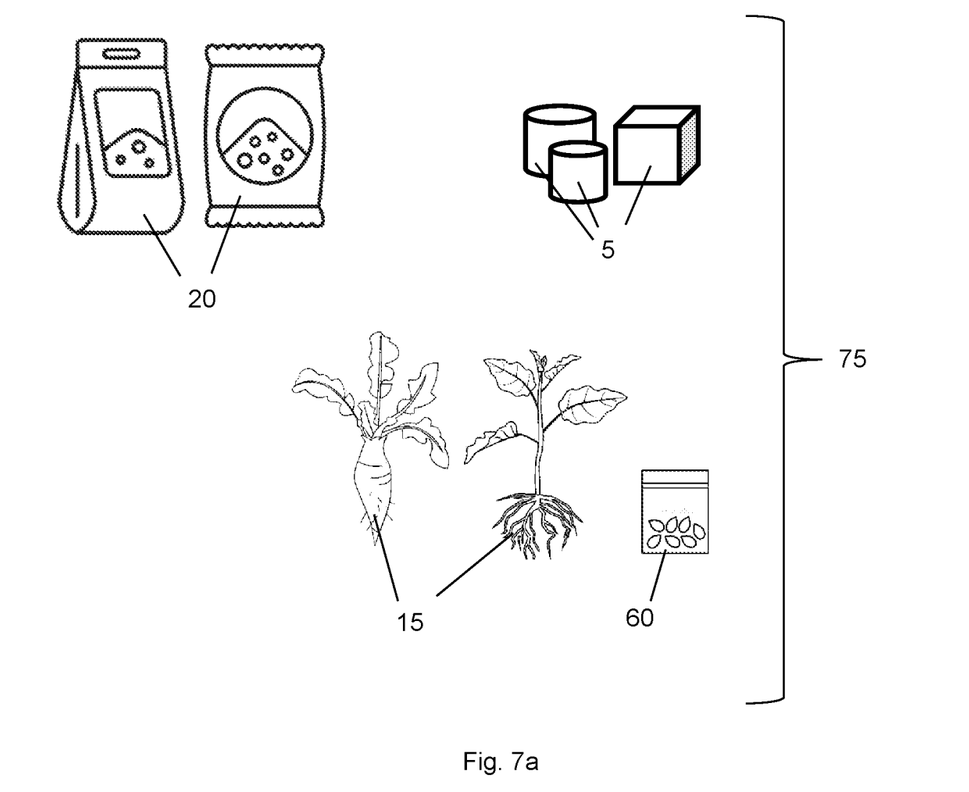
FIG. 7*a* is a representation of a kit comprising soil, plants, seeds, and pots in accordance with some embodiments of the presently disclosed subject matter.
Figure 7B:
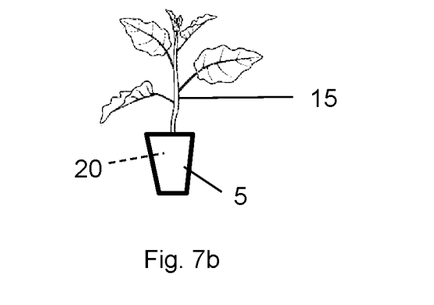
FIG. 7*b* is a cross-sectional view of a plant positioned in a planter pot in accordance with some embodiments of the presently disclosed subject matter.
Figure 7C:
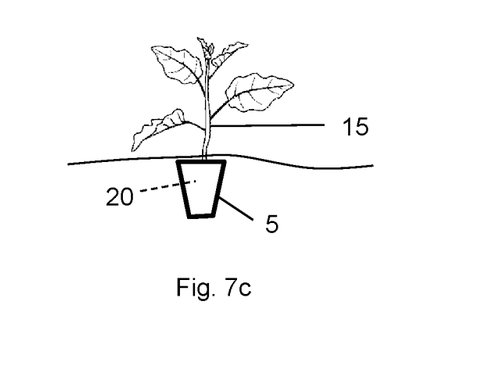
FIG. 7*c* is a cross-sectional view of a planter pot positioned in the ground after planting in accordance with some embodiments of the presently disclosed subject matter.
Figure 7D:
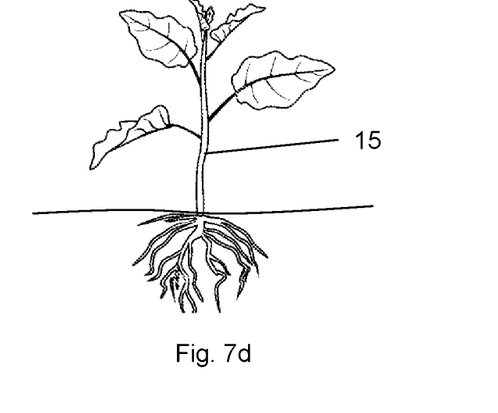
FIG. 7*d* is a cross-sectional view of a plant growing in the ground after the planter pot has biodegraded in accordance with some embodiments of the presently disclosed subject matter.

The disclosed pots can be configured as part of kit 75. For example, FIG. 7a illustrates a series of pots 5 (which can be of various sizes or the same size), seed packets 60, plants 65, and different types of soil 70. A user can select a desired pot 5, add a favorite plant 65 to interior pot compartment 13, and fill the reminder of the interior compartment with a suitable soil, as shown in FIG. 7b. The user can then plant the entire pot (including the plant and soil) in the ground at a desired location, as set out in FIG. 7c. Over time, the plant grows, extending beyond the confines of pot 5, as shown in FIG. 7d. Remaining portions of the pot in the soil after planting will not impede root growth, as the pot is biodegradable, as described below. Thus, the combinations of some or all of the foregoing features provide several embodiments of kit that can be used by gardeners, and especially home gardeners, to easily grow plants in their yard or in other larger pots with less effort and trauma to the plant.

In use, the interior compartment of pot 5 can be filled with soil 20 and one or more plants 15 such that the plant extends above the top surface of the pot, as shown in FIG. 7a. In some embodiments, soil and seeds can be positioned within the pot interior compartment 13. The plant can grow for a desired amount of time under optimal humidity, sunlight, etc. conditions. For example, seeds can germinate directly within the pot interior. At any desired time (e.g., before or after germination or before or after the plant has reached a desired growth height), the pot and plant can be planted directly in the ground. Over time, the pot will biodegrade after the pot is planted indoors (e.g., in a larger pot filled with soil) or outside in the ground. The term "biodegradable" refers to a material that has a measurable half-life in a biological environment. For example, a biodegradable material can include any organic material that can be broken down into organic substances by living organisms, such as microorganisms. Advantageously, the plants are not exposed to the stresses associated with removing of the seedlings or plants from the pots, which can result in lesions and damage to the root system. Biodegradability can be measured using ASTM D5511, incorporated by reference herein.

In some embodiments, the pot is compostable. The term "compostable" refers to an organic material, composition, compound, polymer, etc., that undergoes degradation by biological processes during composting to yield, for example, carbon dioxide, water, inorganic compounds, biomass, and the like, and which may leave no visible, distinguishable, and/or toxic, residue. The compostability of materials, compositions, compounds, polymers, etc., can be measured by ASTM D6400 test method, which is a standard test for determining compostability and which is herein incorporated by reference.

In some embodiments, the pots can fully biodegrade in about 10-200 days. Thus, pot 5 can biodegrade about 10, 20, 30, 40, 50, 60, 70, 80, 90, 100, 110, 120, 130, 140, 150, 160, 170, 180, 190, or 200 days after planting. It will be appreciated that the skilled artisan is capable of adjusting the length of time required for biodegradation of pots 5 by selection of the dimensions of the container (e.g., including relative thickness of zones or portions of the pot) and/or incorporating varying amounts of organic filler, reactive species, and enzymes that hasten the biodegradation of the material.

The presently disclosed subject matter includes many advantages over the prior art. For example, as pot 5 biodegrades, the plant roots are not limited to the interior compartment of the planted pot and can extend well into the soil outside of the confines of the pot.

Advantageously, the disclosed pots can be deposited in the soil, along with the plant roots (or seeds) such that no additional step of removing the plant from the pot is required. Accordingly, the disclosed pots provide for more streamlined use compared to prior art plastic pots.

Because the plants are not removed from the pots, insertion into the soil is less traumatic for the plant and the roots are not disturbed. As such, the plants are healthier as they grow.

Pots 5 are fully biodegradable and therefore do not add to the growing amount of consumer waste produced daily. Thus, the starch materials, silicon material, and additives are capable of decomposing naturally without polluting the outside environment.

As the pots degrade into the soil, the starch breaks down and adds nutrients into the soil surrounding the plant roots. In this way, micronutrients and other advantageous materials are released into the soil.

The disclosed pots can be stackable, thereby saving space when shipping or during storage.

The pots are easy to use, such that even children or the elderly can transplant plants into the soil with little or no difficulty.

Exemplary embodiments of the methods and components of the presently disclosed subject matter have been described herein. As noted elsewhere, these embodiments have been described for illustrative purposes only, and are not limiting. Other embodiments are possible and are covered by the presently disclosed subject matter. Such embodiments will be apparent to persons skilled in the relevant art(s) based on the teachings contained herein. Thus, the breadth and scope of the present invention should not be limited by any of the above-described exemplary embodiments but should be defined only in accordance with the following claims and their equivalents.

What is claimed is:

1. A planter pot comprising:
 a bottom face joined to a lower face of one of more sidewalls, thereby creating a pot with an open top and an interior compartment;
 wherein the planter pot bottom face and sidewalls comprise starch; and
 wherein the planter pot is defined by an outer surface comprising a water-resistant silicon layer coating; and
 wherein the starch bottom face and sidewalls of the planter pot are biodegradable.

2. The planter pot of claim 1, further comprising an inner surface comprising a water-resistant silicon layer coating.

3. The planter pot of claim 1, wherein the planter pot bottom face and one or more sidewalls comprise 100 weight percent starch.

4. The planter pot of claim 1, wherein the planter pot bottom face and sidewalls comprise about 70-99 weight percent starch and about 1-30 weight percent additives.

5. The planter pot of claim 1, wherein the starch is cassava starch.

6. The planter pot of claim 1, further comprising at least one aperture positioned on a surface of the planter pot.

7. The planter pot of claim 1, wherein the silicon layer is deposited on the outer surface by spraying.

8. The planter pot of claim 1, wherein the silicon layer comprises elemental silicon, silica, silicate, or combinations thereof.

9. The planter pot of claim 1, wherein the silicon layer has a thickness of about 0.0001-0.1 inches.

10. The planter pot of claim 1, wherein the planter pot resists the penetration of water by at least about 30, 40, 50, 60, 70, or 80 percent compared to a planter pot that lacks the water-resistant silicon layer.

11. The planter pot of claim 1, wherein the planter pot is fully compostable.

12. A method of growing a plant, the method comprising:
   positioning a plant and soil in a planter pot, wherein the planter pot is defined by:
      a bottom face joined to a lower face of one of more sidewalls, thereby creating a pot with an open top and an interior compartment;
      wherein the planter pot bottom face and sidewalls comprise starch; and
      wherein the planter pot is defined by an outer surface comprising a water-resistant silicon layer coating; and
      wherein the planter pot is biodegradable;
   planting the planter pot in the ground or in the soil;
   whereby the starch bottom face and sidewalls of the planter pot biodegrade, and the plant grows.

13. The method of claim 12, wherein the planter pot is directly planted in soil in the ground or soil in a larger pot.

14. The method of claim 12, wherein the silicon layer comprises elemental silicon, silica, silicate, or combinations thereof.

15. The method of claim 12, wherein the silicon layer has a thickness of about 0.0001-0.1 inches.

16. The method of claim 12, wherein the planter pot has fully degraded about 20-200 days after planting.

17. The method of claim 12, wherein the planter pot is fully compostable.

18. A kit comprising:
   a plurality of planter pots, each defined by:
      a bottom face joined to a lower face of one of more sidewalls, thereby creating a pot with an open top and an interior compartment;
      wherein the planter pot bottom face and sidewalls comprise starch; and
      wherein the planter pot is defined by an outer surface comprising a water-resistant silicon layer coating; and
      wherein the starch bottom face and sidewalls of the planter pot are biodegradable;
   a plurality of plants selected from seeds, seedlings, plants, trees, tubers, or combinations thereof; and
   one or more different soil types.

19. The kit of claim 18, wherein the starch is wheat, barley, corn, rye, rice, sorghum, brans, cassava, millet, milo, potato, sweet potato, or tapioca starch.

20. The kit of claim 18, wherein each planter pot bottom face and one or more sidewalls comprise 100 weight percent starch.

* * * * *